M. OHRYNOWEECH.
DASHER FOR ICE CREAM FREEZERS.
APPLICATION FILED MAY 2, 1910.
976,684.
Patented Nov. 22, 1910.
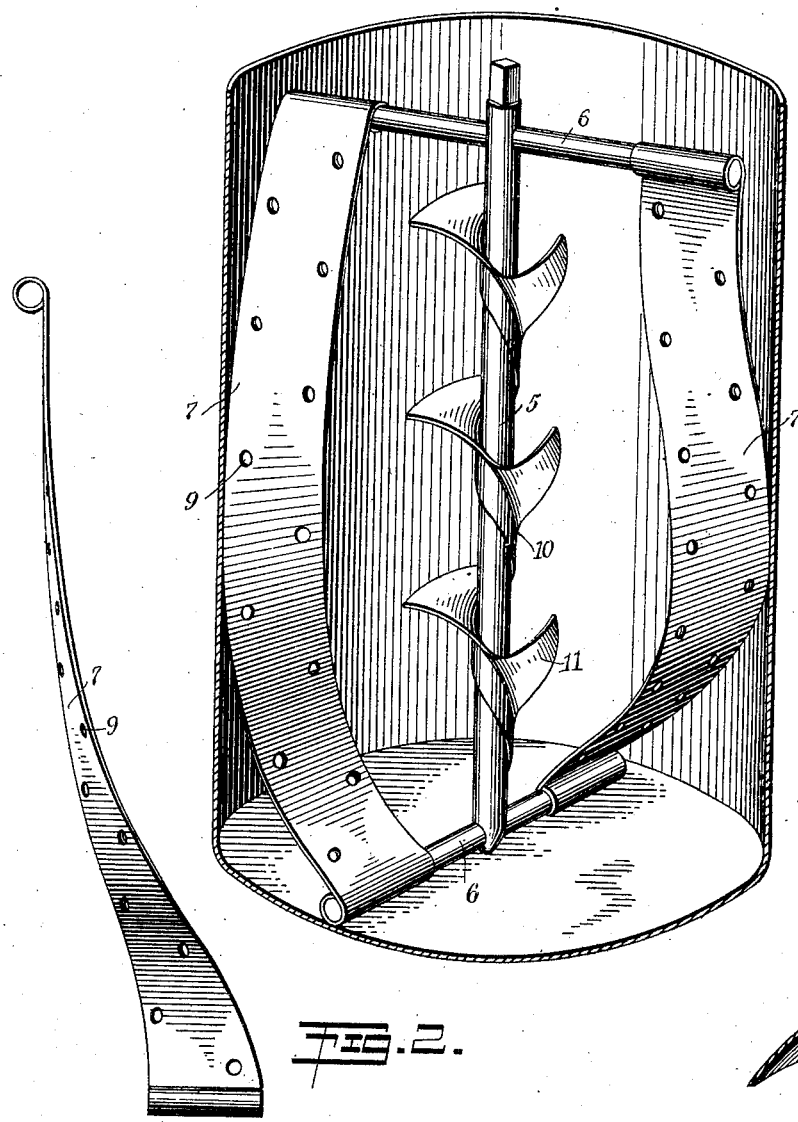
WITNESSES:
G. Robert Thomas
INVENTOR
Martin Ohrynoweech
BY
ATTORNEYS

UNITED STATES PATENT OFFICE.

MARTIN OHRYNOWEECH, OF NEW YORK, N. Y.

DASHER FOR ICE-CREAM FREEZERS.

976,684. Specification of Letters Patent. Patented Nov. 22, 1910.

Application filed May 2, 1910. Serial No. 558,769.

*To all whom it may concern:*

Be it known that I, MARTIN OHRYNO-WEECH, a citizen of the United States, and a resident of the city of New York, borough of Manhattan, in the county and State of New York, have invented a new and Improved Dasher for Ice-Cream Freezers, of which the following is a full, clear, and exact description.

The invention is an improvement in ice cream dashers, and has in view such a device which will enforce the rapid traveling of the cream from the center of the can upwardly and outwardly to the sides, and also force the cream upwardly and inwardly at the sides as it is scraped from this wall of the can, whereby the freezing of the cream takes place rapidly and uniformly throughout, and in this way preventing the cream from freezing and caking at the bottom of the can before that at the center and top solidifies.

The invention further has in view a dasher which will thoroughly mix the cream and render it palatably smooth, as by preventing the formation of crystals of any substantial size.

Reference is to be had to the accompanying drawings forming a part of this specification, in which similar characters of reference indicate corresponding parts in all the views.

Figure 1 is a perspective view of an ice cream dasher embodying my invention, the dasher being shown within the can, with the latter in vertical section; Fig. 2 is a perspective view of one of the scraper blades of the dasher; and Fig. 3 is a section through the central shaft.

In the construction of the dasher I make use of the customary central vertical dasher shaft 5, which is pointed or otherwise shaped at the bottom to fit in the socket of the can, and square or of other angular form at the top to connect it to the operating mechanism, as is the common practice. Adjacent to the upper and lower end portions of the shaft, cross-bars 6 extend therethrough and are radially arranged with respect to the shaft, with one cross-bar positioned at approximately right-angles to the other. These cross-bars serve to carry scraper or circumferential blades 7 for the dasher, each blade having a spiral bend adapting it to force the cream upwardly from the bottom of the can as the cream is scraped from the sides. The scraper blades are shown to be constructed of substantial width, and each provided throughout its length with a number of perforations 9, which serve to effect a thorough mixing of the cream and break up the crystals when the dasher is in operation.

A vertical conveyer 10, centrally arranged on the dasher, forces the cream from the bottom of the freezer upwardly and outwardly toward the sides, and is carried by the dasher shaft 5, the conveyer preferably comprising a series of V-shaped spiral blades 11, with the inner portion or base of each blade adjoining or continuous with the inner portions or bases of the blades above and below, with the points of the blades spaced some distance apart, whereby the cream as it is lifted by the conveyer has an opportunity to flow outwardly between the blades to the sides of the freezer can.

With the dasher thus constructed, the cream is kept constantly traveling at the center from the bottom of the can upwardly and outwardly, and as it freezes to the sides of the can, is driven toward the top and center to the conveyer 10 and in this way prevents the cream from caking at the bottom and sides of the freezer before the center and top of the cream has solidified.

Having thus described my invention, I claim as new and desire to secure by Letters Patent:

1. In an ice cream dasher, a central vertical dasher shaft having cross-bars at the top and bottom respectively, radially arranged and at a substantial angle to each other, spiral scraper blades attached to the outer ends of the cross-bars, discharging upwardly, and an upwardly-discharging conveyer at the center of the dasher and carried by the dasher shaft.

2. In an ice cream dasher, a central vertical dasher shaft, and an upwardly-discharging conveyer carried by the shaft, having approximately V-shaped conveyer blades spirally arranged on the shaft, with the inner portion or base of each blade adjoining the inner portions or bases of the adjacent blades.

3. In an ice cream dasher, a central vertical dasher shaft, and relatively wide, flat, spiral, circumferential blades carried by the shaft and discharging upwardly, the blades spaced from the shaft and making a turn of approximately 90° in the length of the dasher, with the flat faces of the blades arranged substantially normal to the direction of movement.

4. In an ice cream dasher, a central dasher conveyer arranged to discharge upwardly when revolved in one direction, and circumferential spiral dasher blades fixed relatively to the central conveyer and inclined to discharge upwardly and inwardly to the central conveyer when the said central conveyer is revolved in the same direction.

In testimony whereof I have signed my name to this specification in the presence of two subscribing witnesses.

MARTIN OHRYNOWEECH.

Witnesses:
  META KOPPEIMANN,
  JOHN HENRY NUSS KERN.